United States Patent [19]
Hansen

[11] Patent Number: 6,118,203
[45] Date of Patent: Sep. 12, 2000

[54] HIGH EFFICIENCY MOTOR FOR X-RAY GENERATION

[75] Inventor: Steven D. Hansen, Port Washington, Wis.

[73] Assignee: General Electric Company, Milwaukee, Wis.

[21] Appl. No.: 09/325,211

[22] Filed: Jun. 3, 1999

[51] Int. Cl.[7] .......................... H02K 11/00; H02K 1/00; H02K 3/00; H02K 3/04; H02K 1/12

[52] U.S. Cl. ...................... 310/180; 310/68 D; 310/254; 310/208; 310/179; 310/180

[58] Field of Search ................. 310/180, 68 D, 310/254, 208, 179, 194

[56] References Cited

U.S. PATENT DOCUMENTS

| | | | |
|---|---|---|---|
| 4,024,424 | 5/1977 | Eggelsmann | 313/60 |
| 4,115,718 | 9/1978 | Eggelsmann | 313/60 |
| 4,360,734 | 11/1982 | Dietz | 378/93 |
| 4,679,220 | 7/1987 | Ono | 378/132 |
| 4,780,900 | 10/1988 | Gabbay et al. | 367/132 |
| 4,811,375 | 3/1989 | Klostermann | 378/131 |
| 5,386,451 | 1/1995 | Hansen | 378/131 |
| 5,828,210 | 10/1998 | Kliman et al. | 324/173 |

*Primary Examiner*—Clayton LaBalle
*Assistant Examiner*—Guillermo Perez
*Attorney, Agent, or Firm*—Kilpatrick Stockton; Christian G. Cabou; Phyllis Y. Price

[57] ABSTRACT

An x-ray generating device having an improved high efficiency motor is disclosed. The x-ray generating device comprises a cathode assembly and an anode assembly arranged opposite each other in a vacuum vessel. According to the invention, the anode assembly is coupled and rotated by the rotor of a high efficiency motor which has near traditional gaps by positioning the motor stator assembly in close proximity to the rotor of the motor and applying a same potential to both the stator core and the rotor. The stator assembly further includes poly-phase stator winding coils arranged on the stator core. The coils are electrically insulated from the stator core, and they are supplied with poly-phase AC signals from a motor controller to induce magnetic interactions and rotate the rotor and the anode assembly. Thus, the present invention provides for electrical isolation between the x-ray operating potential and the reference potential of the motor controller without the need for a separate isolation transformer which negatively impacts cost, efficiency and reliability.

28 Claims, 4 Drawing Sheets

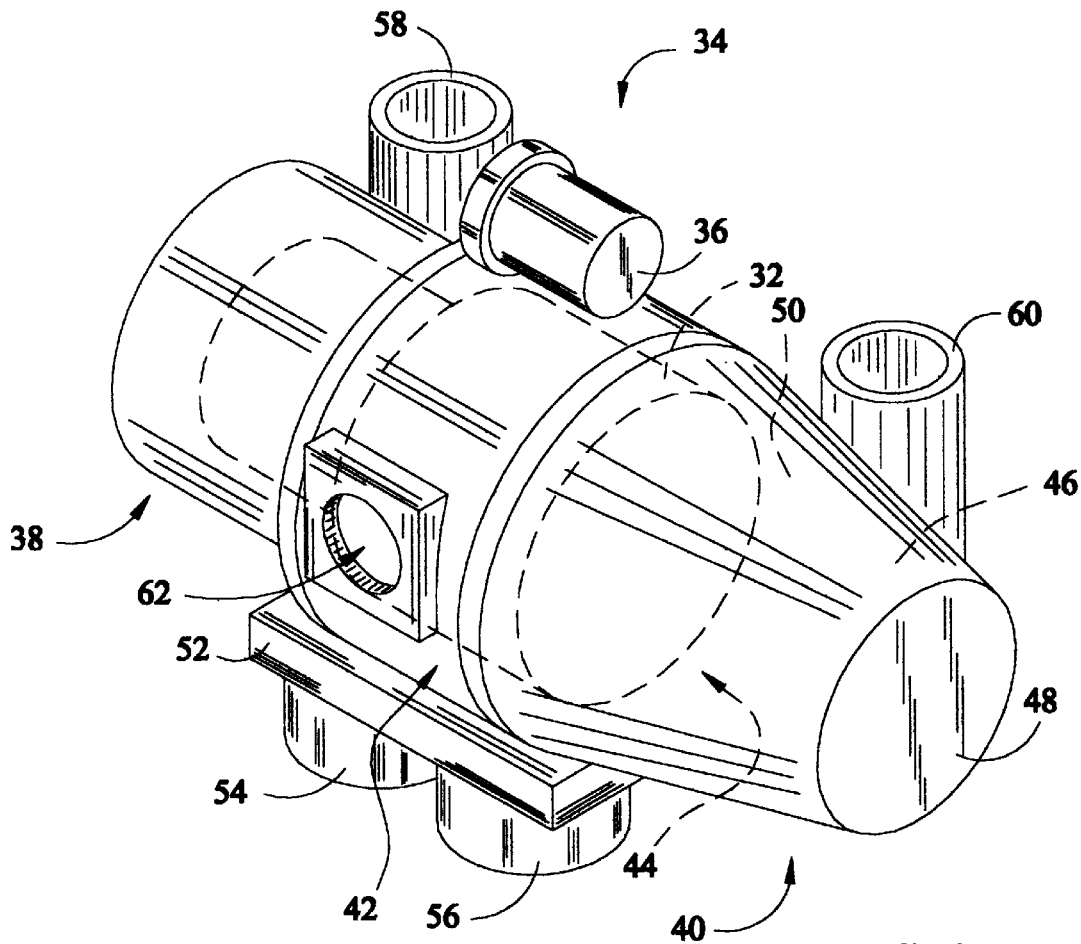
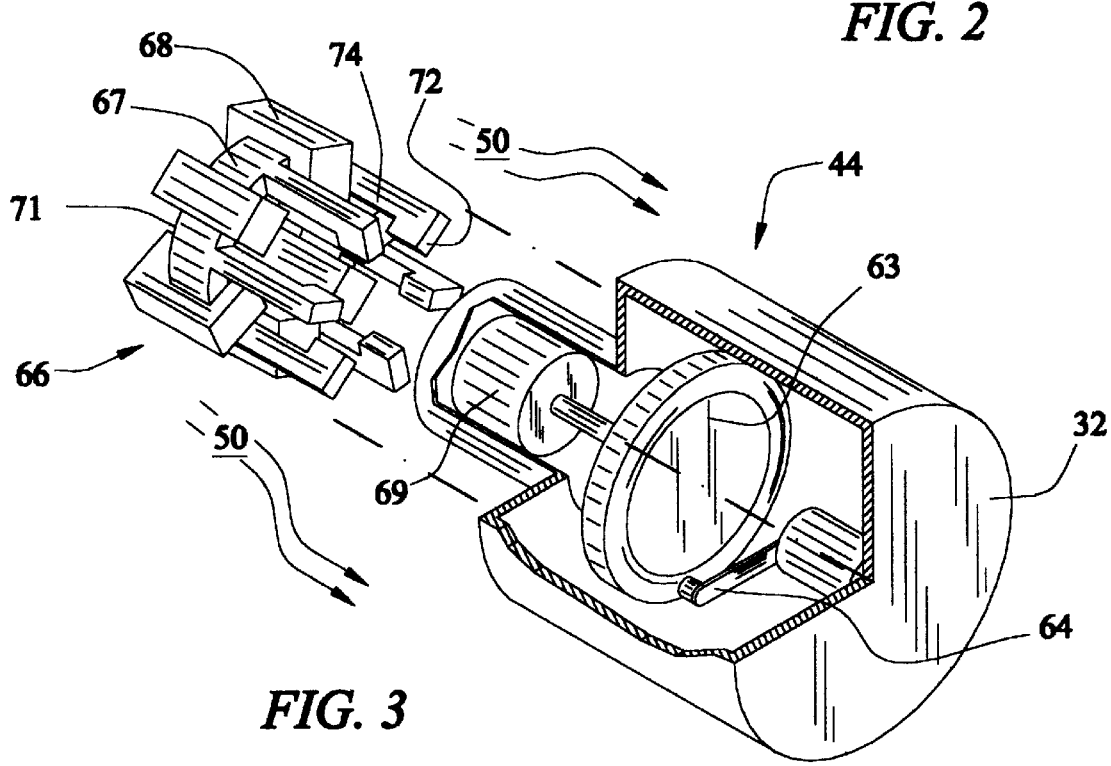
FIG. 2
FIG. 3

HIGH EFFICIENCY MOTOR FOR X-RAY GENERATION

BACKGROUND OF THE INVENTION

The present invention relates to an advanced rotation system used in x-ray generation, and more particularly, to a high efficiency motor employed in such system.

Typically, an x-ray beam generating device, referred to as an x-ray tube, comprises opposed electrodes enclosed within a cylindrical vacuum vessel. The vacuum vessel is typically fabricated from glass or metal, such as stainless steel, copper or a copper alloy. The electrodes comprise a rotating disc-shaped anode assembly and a cathode assembly that is positioned at some distance opposite from the target track of the anode assembly. The target track, or impact zone, of the anode is generally fabricated from a refractory metal with a high atomic number, such as tungsten or tungsten alloy. Further, to accelerate the electrons, a typical voltage difference of 60 kV to 150 kV is maintained between the cathode and anode assemblies. The hot cathode filament emits thermal electrons that are accelerated across the potential difference, impacting the target zone of the anode at a high velocity. A small fraction of the kinetic energy of the electrons is converted to high energy electromagnetic radiation, or x-rays, while the balance is contained in back scattered electrons or converted to heat. The x-rays are emitted in all directions, emanating from the focal spot, and may be directed out of the vacuum vessel. In an x-ray tube having a metal vacuum vessel, for example, an x-ray transmissive window is fabricated into the metal vacuum vessel to allow the x-ray beam to exit at a desired location. After exiting the vacuum vessel, the x-rays are directed to penetrate an object, such as human anatomical parts for medical examination and diagnostic procedures. The x-rays transmitted through the object are intercepted by a detector and image is formed of the internal anatomy. Further, industrial x-ray tubes may be used, for example, to inspect metal parts for cracks or to inspect the contents of luggage at airports.

With the increase in x-ray tube size and power dissipation capabilities there has been an associated evolution in motor technology employed for the rotation of the x-ray tube anode assembly. Currently, the most powerful and advanced rotation system used in x-ray tube technology is an induction motor that leverages an anode potential stator which results in a motor with near traditional magnetic gap spacing of approximately 1.5 mm to 2.0 mm between the stationary and rotating components. The stationary members include the stator frame and windings, while the rotating members include the rotor assembly encompassing a magnetic yoke and copper current carrying conductors. The near traditional magnetic gap spacing allows the use of commercially available control systems and delivers performance parameters typical of poly-phase induction motor machines.

One application for an induction motor having this near traditional magnetic gap spacing, termed a High Efficiency Motor (HEM), is in x-ray tubes with metal vacuum containment enclosures utilized on high performance diagnostic systems. FIG. 1 shows the application of the HEM 10 in a typical high voltage sub-system 12 for x-ray generation. At first glance, the HEM 10 is basically a three-phase induction motor that includes a stator 14, which comprises a stator frame and three-phase windings, and a rotor 16, which is electrically connected and physically attached to the rotating disc-shaped anode assembly 18 to perform the rotation. A metal vacuum enclosure, or frame 20 encloses both the rotor and the anode assembly. The HEM 10, however, is unique in that the stator 14 and rotor 16 are in very close proximity to each other, unlike most traditional x-ray tubes. This is made possible by making the metal frame 20 thin enough to support near traditional gaps, while maintaining high structural stability and strength. It is this close proximity of the stator to the rotor that produces the high performance aspects of the HEM 10, which can deliver 2.0 HP in the acceleration phase and employ dynamic braking schemes because of the relatively good coupling of the rotor to the stator. It should be noted that vacuum frame 20 can also be made of glass that is thick enough to withstand the vacuum pressure while sufficiently thin to afford the desired near traditional gap.

Because of the power requirement for x-ray generation, the anode assembly 18 is supplied with a high potential, for example, of about 70,000 volts by a high voltage anode supply 22 via a high voltage (HV) cable 24. Since the rotor 16 is electrically connected to the anode assembly 18, the rotor is fed with the same high potential. The close proximity of stator 14 to rotor 16 also requires that the stator itself be running at such high potential to achieve the tight gap. In other words, the three phase windings of the stator 14 are referenced to the anode potential of about 70,000 volts instead of ground. These windings, however, are being powered by a motor controller 26 that is ground referenced with three-phase voltage outputs 28. Due to the difference in potential referencing, an isolation transformer 30 is thus used to electrically insulate and protect the stator assembly 14 and the motor controller 26 from each other. The isolation transformer 30 is a one-to-one transformer, in this case a delta-to-delta transformer, with one side connected to the motor controller 26 referenced at ground, and the other side connected to the stator assembly 14 referenced at the high voltage anode supply 22 of about 70,000 volts.

The major disadvantage to the above prior art approach of the HEM is the requirement for an isolation transformer 30 to electrically insulate the stator assembly 14, which is referenced to the operating potential of the x-ray tube, and the output of the motor controller 26, which is three-phase ground referenced. The necessary, separate isolation transformer 30 requires additional hardware be added to the high voltage sub-system 12 for x-ray generation, which negatively impacts cost, size and reliability. There is thus a need for eliminating the separate isolation transformer while retaining its isolation function to electrically insulate and protect the motor 10 and the motor controller 26 from each other. Additionally, the separate isolation transformer between ground and high potential in the prior art system is disadvantageous because of their excessive power consumption and heat generation of the isolation transformer.

SUMMARY OF THE INVENTION

To solve the problems of the prior art, an embodiment of the present invention introduces a novel high efficiency motor that integrates the high potential isolation capability of an isolation transformer into the HEM stator. This is accomplished through the combination of the windings of an isolation transformer and the iron core of the HEM stator assembly. This inventive concept reduces the overall system cost by integrating functionality while reducing components. Additionally, the new HEM contributes to greater system reliability by having fewer components, which result in fewer chances for defect within the system. Fewer components also mean a reduction in size and weight of the overall system. Typically, these components are mounted on a computed tomography system gantry where space is precious; therefore, a reduction in size and weight simplifies the assembling of the system. Furthermore, the large high potential region often associated with the prior art HEM is reduced through the elimination of the isolation transformer, and problems often associated with such large, high potential region such as extra insulation, excessive power consumption and heat generation, are eliminated.

According to one embodiment, the HEM of the present invention includes a stator that performs the dual function of providing a rotating magnetic field for the motor, as well as providing the isolation between x-ray operating potential and ground via an incorporated isolation transformer. According to this embodiment, an x-ray generating device comprises a cathode assembly and an anode assembly enclosed in a vacuum frame. The anode assembly is rotated by a poly-phase, and in one embodiment a three-phase, induction motor having a rotor enclosed within the vacuum frame and coupled to the anode assembly. The motor further includes a stator assembly comprising poly-phase high voltage winding coils arranged on a stator core, the latter extending the length of the rotor, such that the vacuum frame is positioned between the stator core and the rotor. A high operating potential for x-ray generation is applied to the anode assembly, the rotor, and the stator core. The stator winding coils are also supplied with typical motor operational potentials that are referenced to ground. These coils are electrically insulated from the stator core. Thus, electrical isolation between x-ray operating potential and the reference ground of the motor controller is achieved by the coil insulation without any requirement of a separate isolation transformer.

BRIEF DESCRIPTION OF THE DRAWINGS

FIG. 2 is a perspective view of a representative housing, for use in accordance with an embodiment of the present invention, having an x-ray generating device or x-ray tube positioned therein;

FIG. 3 is a sectional perspective view of FIG. 2 with the stator exploded to reveal a portion of the anode assembly of an x-ray generating device incorporating an embodiment of the novel high efficiency motor of the present invention;

DETAILED DESCRIPTION OF THE INVENTION

Figure 1:
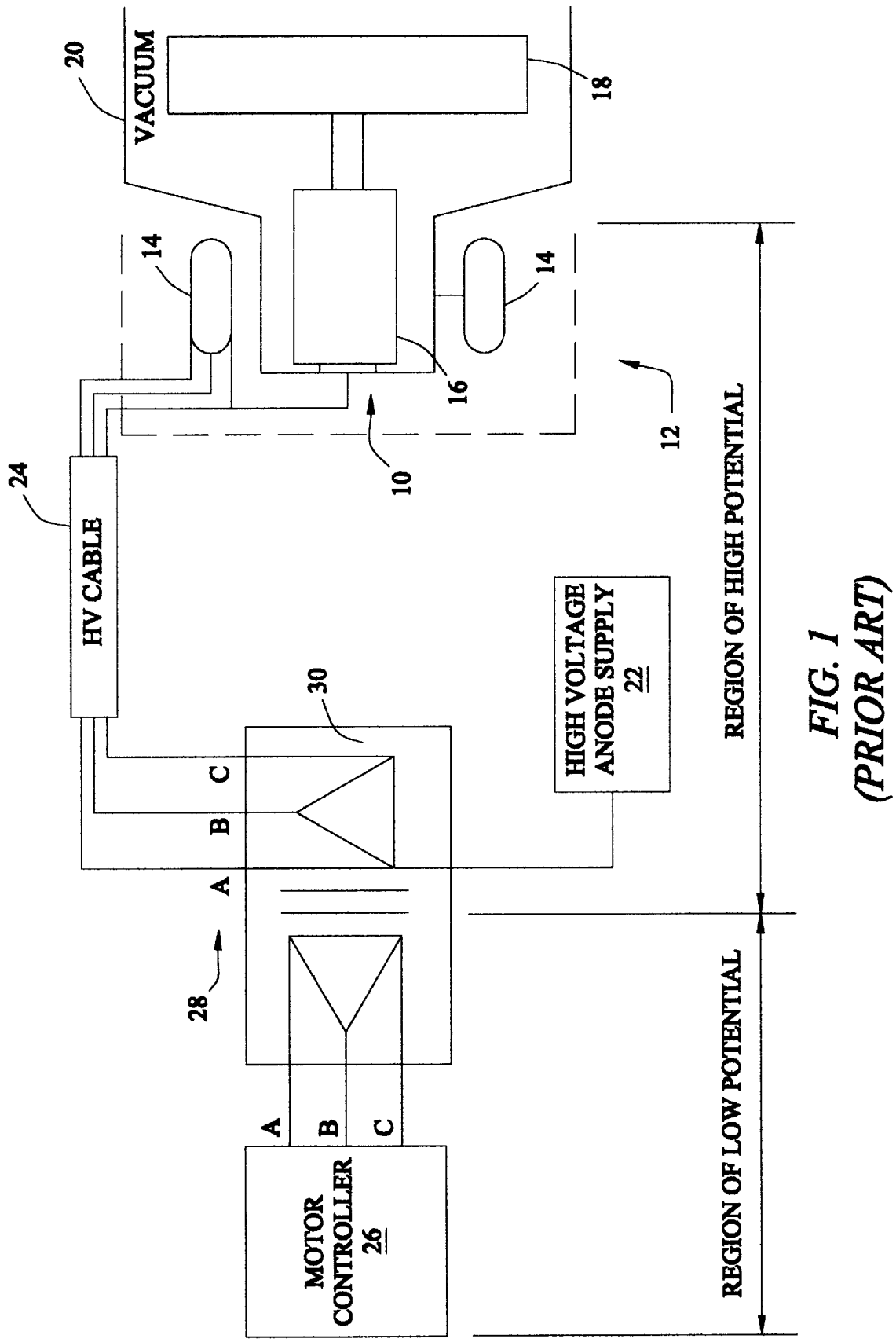
FIG. 1 is a schematic representation of a high voltage sub-system for x-ray generation according to the prior art.

Referring to FIG. 2, a typical housing unit 34 for attachment to an x-ray system comprises an oil pump 36, an anode end 38, a cathode end 40, and a center section 42 positioned between the anode end and cathode end, which contains the x-ray generating device or x-ray tube 44. The x-ray tube 44 is enclosed in a fluid chamber 46 within lead-lined casing 48. The chamber 46 is typically filled with fluid 50, such as dielectric oil, but other fluids including air may be utilized. Fluid 50 circulates through housing 34 to cool x-ray generating device 44 and to insulate casing 48 from the high electrical charges within the x-ray generating device. A radiator 52 for cooling fluid 50 is positioned to one side of the center section and may have fans 54 and 56 operatively connected to the radiator for providing cooling air flow over the radiator as the hot oil circulates through it. Pump 36 is provided to circulate fluid 50 through casing 48 and through radiator 52, etc. Electrical connections in communication with the x-ray tube 44 are provided through the anode receptacle 58 and cathode receptacle 60. A window 62 is provided for emitting x-rays from vacuum frame 32 and casing 48.

Referring to FIG. 3, a typical x-ray tube 44 comprises rotating target anode assembly 63 and a cathode assembly 64 disposed in a vacuum within vessel or frame 32. A stator assembly 66, which comprises a stator core or frame 67 and numerous three-phase stator winding coils 68, is positioned over rotor 69 and vacuum frame 32 adjacent to rotating target anode 63. Upon energization of the electrical circuit connecting cathode assembly 64 and anode assembly 63, a stream of electrons are generated from the cathode assembly and accelerated toward the anode assembly. The stream of electrons strike a focal spot on the anode assembly 63 and produce high frequency electromagnetic waves, or x-rays, and residual energy. The x-rays are directed through the vacuum toward window 62 (FIG. 2) and out of the casing 48. Meanwhile, the residual energy is absorbed by the components within x-ray tube 44 as heat.

The high efficiency induction motor 70 (FIG. 6) advantageously eliminates the isolation transformer as a separate component. This is accomplished through the combination of the stator iron core and the windings of the isolation transformer. Thus, the stator assembly 66 performs the dual function of providing a rotating magnetic field for the motor 70 as well as providing the isolation between tube operating potential and ground via an incorporated isolation transformer. This dual function is achieved by replacing the traditional windings of the stator with windings that provide the same magnetizing current yet are designed for electrical insulation of the operating potential. This is accomplished by replacing the traditional windings with insulated windings. To accommodate the required high voltage insulation the magnetic core of the stator is configured as shown in FIG. 3. The stator frame 67 includes a ring-shaped core base 71 with a longitudinal component 74 extending the length of the rotor 69 and having a radial component 72 extending from one end. Furthermore, the winding coils 68 are totally insulated from the stator frame 67.

Figure 4:
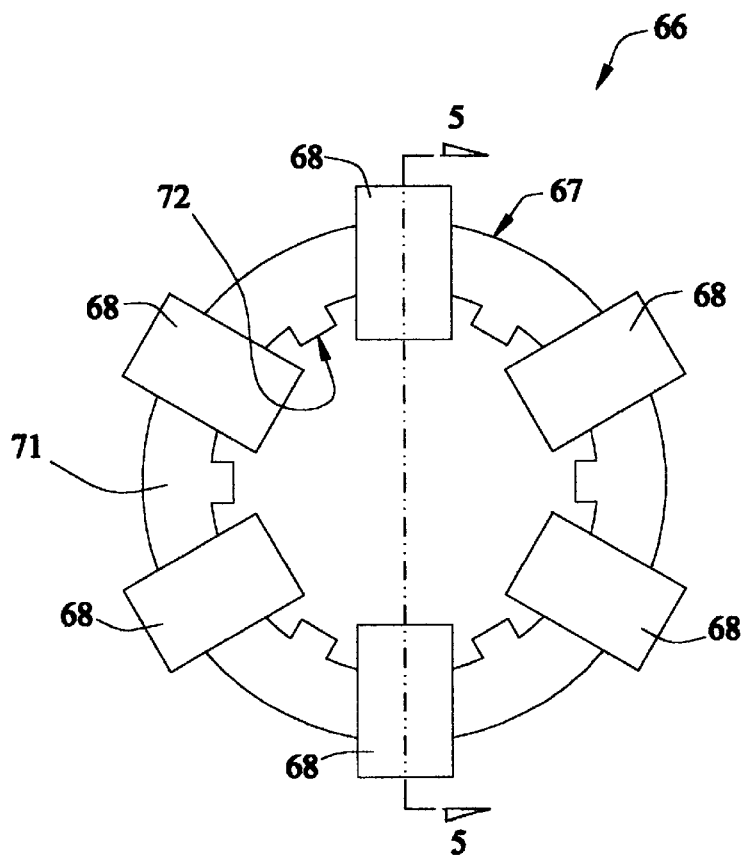
FIG. 4 is a stator end view of the high efficiency motor assembly of FIG. 3 with the x-ray tube removed for clarity.
Figure 5:
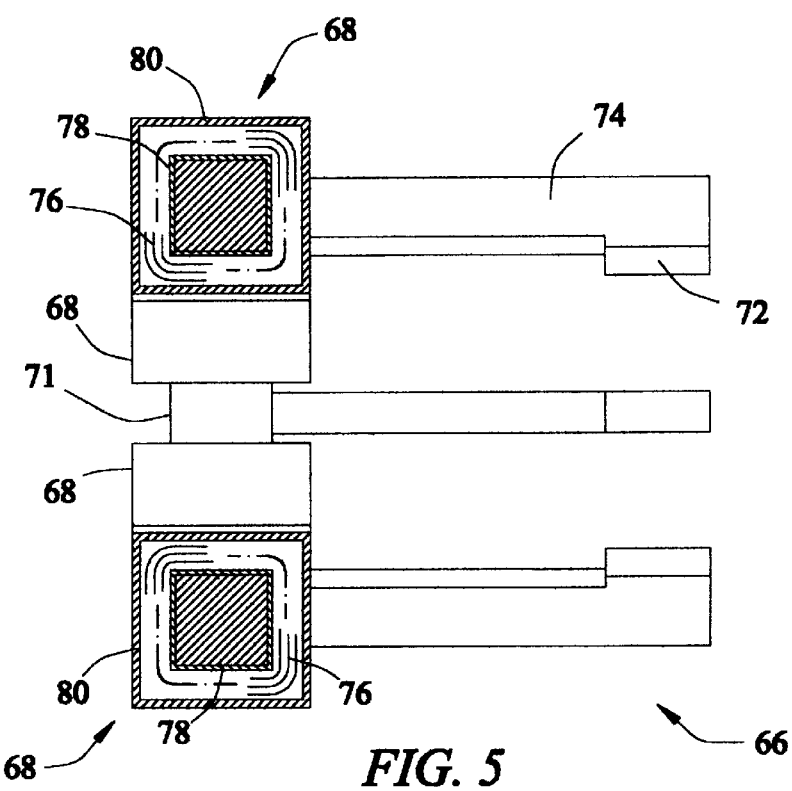
FIG. 5 is a cross sectional view of the high efficiency motor assembly of FIG. 4 along line 5—5.

FIG. 4 shows an end view of the stator assembly 66 of FIG. 3 and its windings, with x-ray tube 44 removed for clarity. FIG. 5 shows a cross sectional view of Fig.4 along line 5—5. Stator frame 67 is made of the same laminated steel as that of the traditional stator to enable magnetic flux to flow through it. The three-phase stator winding coils 68 are then wound and inserted at one end of the stator frame 67. The construction of the winding coils is now described with reference to FIG. 5. Each coil 68 is constructed by first winding insulated wires 76 on a bobbin 78, and the wound bobbin is totally encapsulated in plastic or some other well known high voltage insulation material 80. The result is a totally sealed and insulated winding coil unit 68. The stator frame 67, on the other hand, is constructed from separate pole pieces; thereupon, the winding coils 68 in the form of insulated bobbins are inserted between the pole pieces before the ring-shaped components of the core base are attached together to form the stator frame 67. Although the winding coils 68 are positioned on the core base 71 at one end of the stator frame 67 in FIGS. 3–6, they can be positioned at other locations on the stator frame, such as on the longitudinal components of the pole pieces of the stator frame.

Figure 6:
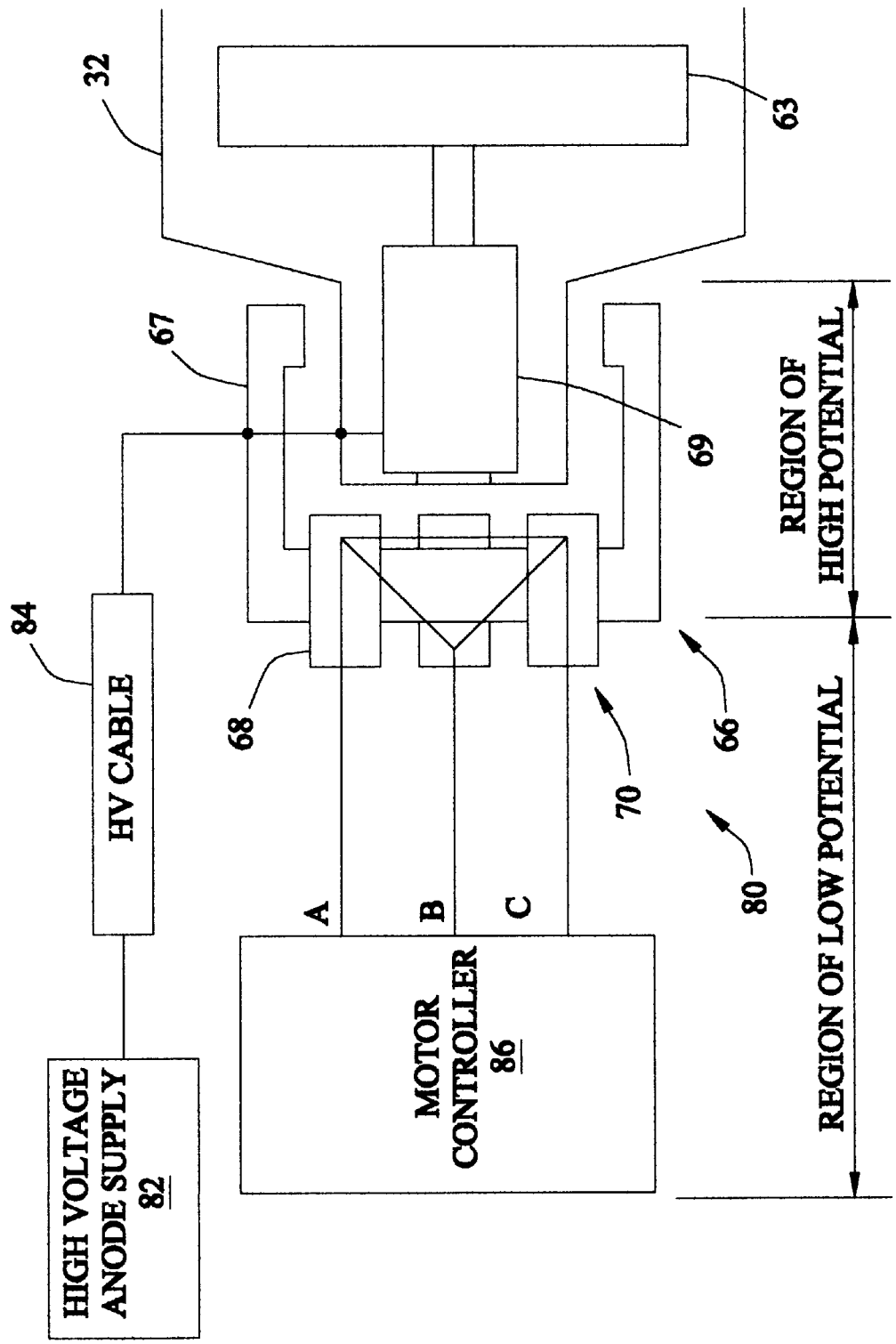
FIG. 6 is a schematic representation of a high voltage sub-system of an embodiment of the present invention, which includes the novel high efficiency motor, for the x-ray generating device of FIG. 3.

Referring to FIG. 6, the high voltage sub-system 80 contributes the high electric potential for x-ray generation and controls the novel high efficiency motor 70. The high electric potential supplied is a potential suitable to operate an x-ray system. For example, the high potential may be in the range of 20 to 150 kV, and preferably in the range of 80 to 140 kV. The high efficiency motor of the present invention eliminates the need for a separate isolation transformer. As in FIGS. 3–5, the stator assembly 66 includes stator frame 67 of laminated steel and insulated, high voltage stator winding coils 68. The rotor 69 is electrically connected and physically attached to the rotating disc-shaped anode assembly 63 to perform the rotation. A metal vacuum enclosure or frame 32 encloses both the rotor 69 and the anode assembly 63, and it is made sufficiently thin to allow for the close proximity of the stator assembly 66 to the rotor and to support near traditional gaps while maintaining high structural stability and strength. Vacuum frame 32 can also be made of glass that is thick enough to withstand the vacuum pressure while sufficiently thin to support the desired near traditional gaps. Again, both rotor 69 and anode assembly 63 are supplied with a high potential, for example, of about 70,000 volts from a high voltage anode supply 82 via the high voltage (HV) cable 84. Due to the close proximity of the stator frame 67 to the rotor 69, the stator frame itself is also fed with the same HV cable 84 and charged at the same high potential. Further, the stator winding coils 68 are wound at one end of the stator frame 67 and powered by the outputs of motor controller 86, which is ground referenced. As mentioned earlier, the winding coils 68 can be wound on the longitudinal components of the pole pieces or on the stator frame 67; i.e., the winding coils can be moved anywhere along the cross-sectional C-shape stator frame of FIG. 6 so long as the three-phase AC signals on the winding coils induce proper circular magnetic flux flow through stator frame 67 and rotor 69 to generate the rotation of the rotor and the anode assembly 63. As with the rotor of a traditional induction motor, rotor 69 is made of an iron yoke and solid copper, the latter acting as a continuous conductive winding coil. The distribution of the three-phase stator winding coils 68 give an effect of multiple magnetic poles that generate a rotating magnetic field, inducing a current in the rotor 69. The interaction between the rotating magnetic field and the electrical field in the rotor 69 produces the torque to turn the rotor. The entire system, which includes the high voltage sub-system 80 and the x-ray tube 44 (FIG. 3), is locally controlled by an onboard computer or CPU (not shown), which is in communication with and controlled by a remote stationary computer (not shown) commanded by an operator.

There are numerous advantages to the novel high efficiency motor (HEM) 70 of the present invention. First of all, the elimination of a separate isolation transformer translates into a reduction in the manufacturing cost and system space requirement and improves reliability because of fewer components. Secondly, this novel HEM approach improves efficiency by directly converting electrical energy from the three-phase outputs of the motor controller to magnetic energy through the motor. This eliminates the multiple energy conversions that is required of the prior art approach in which electrical energy is converted to magnetic energy through the isolation transformer back to electrical energy again through the HV cable and back to magnetic energy by the motor down to the X-ray tube. Thirdly, the new HEM approach limits the high potential region of the system, as can be compared between FIG. 1 and FIG. 6, and thus decreases the problems that are often associated with such region.

Although the invention has been described with reference to the above preferred embodiments, other embodiments can achieve the same results. Variations and modifications of the present invention will be apparent to one skilled in the art and the following claims are intended to cover all such modifications and equivalents.

What is claimed is:

1. An x-ray generating device comprising:
    a cathode assembly;
    an anode assembly arranged in opposition to the cathode assembly;
    a vacuum frame enclosing the cathode assembly and the anode assembly;
    a motor coupled to the anode assembly, the motor comprises:
        a rotor coupled to the anode assembly to provide rotating motion to the anode assembly;
        a stator core surrounding the rotor, wherein the stator core is charged at a high potential; and
        at least one stator winding coil arranged on the stator core, the coil is charged with an electrical signal that is referenced at a potential other than the high potential.

2. An x-ray generating device as recited in claim 1, wherein the high potential is sufficient for the cathode and anode assemblies to perform x-ray generation.

3. An x-ray generating device as recited in claim 1, wherein the motor is a poly-phase induction motor having a plurality of stator winding coils arranged on the stator core, and the rotor is charged at the high potential.

4. An x-ray generating device as recited in claim 3, wherein the poly-phase induction motor is a three-phase induction motor.

5. An x-ray generating device as recited in claim 1, wherein the rotor is enclosed by the vacuum frame such that the vacuum frame is positioned between the stator core and the rotor.

6. An x-ray generating device as recited in claim 1, wherein the at least one stator winding coil is electrically insulated from the stator core.

7. An x-ray generating device as recited in claim 6, wherein the at least one stator winding coil is encapsulated in a high voltage insulation material.

8. An x-ray generating device as recited in claim 3, wherein the stator winding coils are electrically insulated from the stator core.

9. An x-ray generating device as recited in claim 8, wherein each of the stator winding coils is encapsulated in a high voltage insulation material.

10. An x-ray generating device comprising:
    a cathode assembly;
    an anode assembly arranged opposite to the cathode assembly and supplied with an operating potential for x-ray generation;
    a vacuum frame enclosing the cathode assembly and the anode assembly;
    a three-phase induction motor coupled to the anode assembly, the motor comprises:
        a rotor positioned within the vacuum frame and coupled to the anode assembly to provide rotating motion to the anode assembly, the rotor is supplied with the x-ray operating potential;
        a stator core extending the length of the rotor such that the vacuum frame is positioned between the stator core and the rotor, the stator core is supplied with the x-ray operating potential; and three-phase stator winding coils arranged on the stator core and electrically insulated from the stator core and referenced at a potential other than the operating potential.

11. An x-ray generating device as recited in claim 10, wherein at least one of the stator winding coils is encapsulated in a high voltage insulation material.

12. An x-ray generating device as recited in claim 10, wherein at least one of the stator winding coils is arranged on one end of the stator core.

13. An x-ray generating device as recited in claim 10, wherein at least one of the stator winding coils is arranged at a portion of the stator core that extends the length of the rotor.

14. An x-ray generating device as recited in claim 10, wherein the potential of the stator winding coils being supplied with electrical signals are referenced at a ground potential.

15. A method for rotating an anode assembly of an x-ray generating device with a motor, wherein the motor comprises a rotor coupled to the anode assembly and a stator assembly in close proximity with the rotor, the stator assembly includes a stator frame and insulated stator winding coils positioned on the stator frame, the method comprising:

applying an operating potential to the anode assembly for x-ray generation;

applying voltages at a reference potential to the stator winding coils to generate a rotating magnetic field by the stator assembly, wherein the reference potential of the stator winding coils is different from the x-ray operating potential;

rotating the rotor and the anode assembly by magnetic interaction between the rotating magnetic field and currents induced in the rotor by the rotating magnetic field.

16. A method for rotating an anode assembly of an x-ray generating device as recited in claim 15, wherein the reference potential of the stator winding coils is ground.

17. A method for rotating an anode assembly of an x-ray generating device as recited in claim 15, further includes applying the x-ray operating potential to the stator frame.

18. A method for rotating an anode assembly of an x-ray generating device as recited in claim 15, wherein at least one of the stator winding coils is wound on one end of the stator frame or on a portion of the stator frame that extends along the length of the rotor.

19. A method for rotating an anode assembly of an x-ray generating device as recited in claim 15, further includes applying the x-ray operating potential to the rotor.

20. A method for rotating an anode assembly of an x-ray generating device as recited in claim 15, wherein the rotor and the anode assembly are enclosed by a vacuum frame such that the vacuum frame is positioned between the rotor and the stator frame.

21. An induction motor for rotating an anode of an x-ray generating device, comprising:

a stator frame adapted for transferring a magnetic flux, said stator frame operable at a high potential;

a winding coil disposed on said stator frame and adapted for energization to produce said magnetic flux, said winding coil operable at a coil potential which is referenced at a potential other than said high potential; and a rotor adapted for receiving said magnetic flux and inducing rotation of said anode.

22. An induction motor as recited in claim 21, wherein the coil potential is referenced at ground.

23. An induction motor as recited in claim 21, further comprising:

a second winding coil disposed on said stator frame and operable at the coil potential.

24. An induction motor system for rotating an anode of an x-ray generating device, comprising:

a motor controller operable to provide a first potential;

a high voltage anode supply to provide a second potential;

a stator frame operable at said second potential;

a winding coil operable at said first potential;

a rotor operable at said second potential;

wherein the motor controller provides the first potential to the winding coil, and the high voltage anode supply provides the second potential to the stator frame and the rotor; and wherein the first potential is referenced at a potential other than said second potential.

25. An induction motor system as recited in claim 24, wherein the winding coil is electrically insulated from the stator frame.

26. An induction motor system as recited in claim 24, wherein the rotor and the stator frame are at equipotential during operation of the induction motor system.

27. An induction motor system as recited in claim 24, wherein the first potential is referenced at ground.

28. An induction motor system as recited in claim 24, wherein the second potential comprises an operating potential for said x-ray generating device.

* * * * *